May 11, 1926.

A. MOORHOUSE

MOTOR VEHICLE

Filed Oct. 30, 1920

Inventor
Alfred Moorhouse
By
Attorney

May 11, 1926.

A. MOORHOUSE

MOTOR VEHICLE

Filed Oct. 30, 1920

Inventor
Alfred Moorhouse,
By Miller Tibbitts
Attorney

Patented May 11, 1926.

1,584,188

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 30, 1920. Serial No. 420,687.

This invention relates to motor vehicles and particularly to change speed mechanism for such vehicles.

As is well known it is possible to run commercial vehicles or trucks at a higher rate of speed when they are equipped with pneumatic tires than when these vehicles are provided with solid tires. It will be evident therefore that a range of speeds suitable for the solid tired trucks would not include a speed as high as could be advantageously used on a pneumatic tired truck.

However at the present time most manufacturers furnish the same models of trucks with either solid or pneumatic tires as ordered and in order to obviate the necessity of redesigning the entire change speed mechanism it has been found desirable to use an auxiliary change speed mechanism.

This invention has for one of its objects, therefore, to provide an auxiliary change speed unit that may be interposed in the transmission mechanism of a motor vehicle to give an additional range of speeds.

Another object of the invention is to provide an auxiliary change speed unit that will be readily attachable to and detachable from motor vehicles of conventional design and construction.

Another object of the invention is to provide a change speed unit that is simple in construction and may be economically manufactured.

Further objects of the invention will appear from the following specification taken in connection with the drawings which form a part of this application, and in which.

The auxiliary change speed unit, described briefly, comprises a casing which is secured in this instance to the clutch casing and extends outwardly therefrom, the drive shaft extending into this casing and the driven shaft also being journaled in this casing. Epicyclic or planetary gearing is enclosed within this casing and connects the drive shaft to the driven shaft and means such as a slidable pinion is mounted on the drive shaft and is adapted to connect the drive shaft to the driven shaft directly with no change speed or through the planetary gearing thereby effecting in this instance a step up in the speed.

Figure 1:
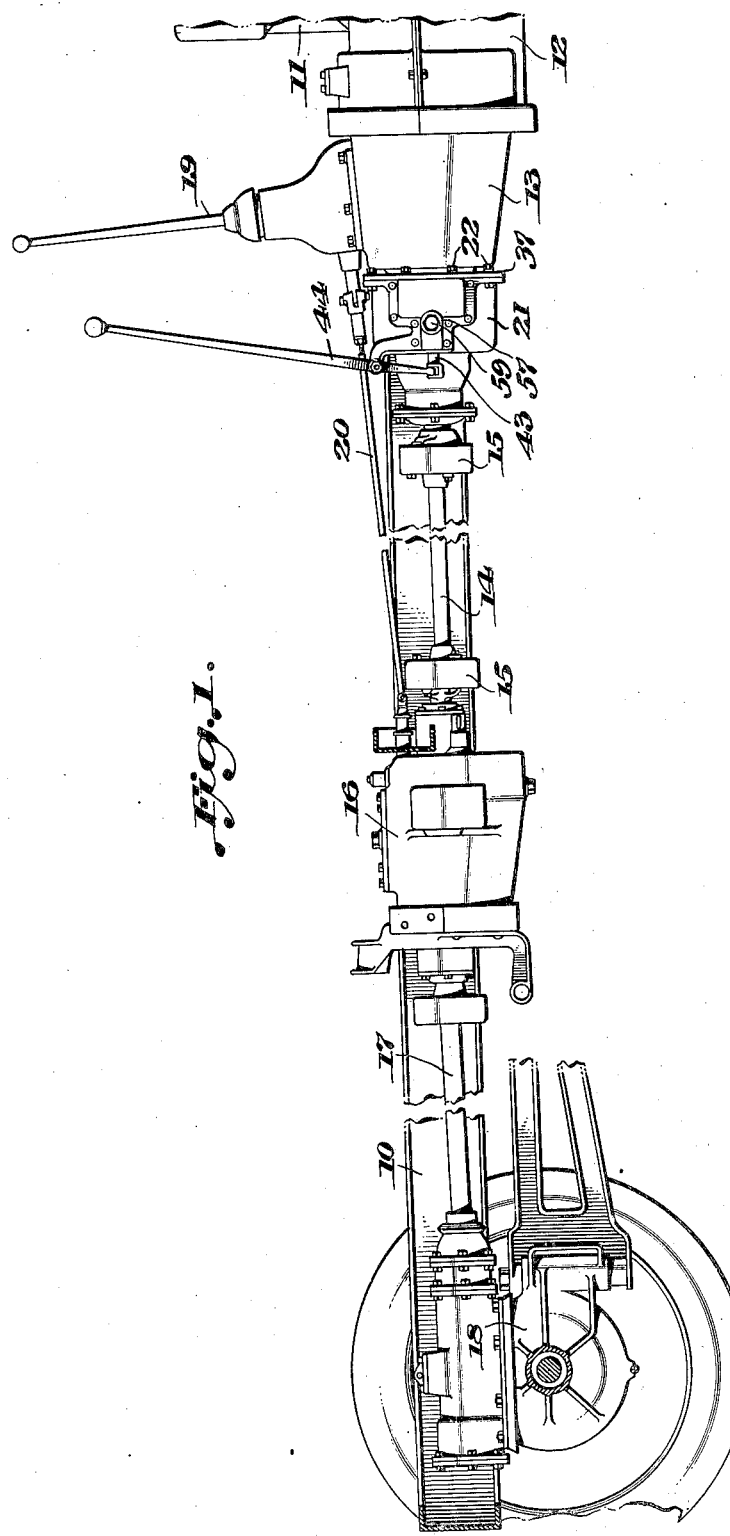
Figure 1 illustrates in side elevation a portion of the chassis of a commercial vehicle, parts being broken away and other parts being shown in section.

Referring now to the drawings I have illustrated in Fig. 1, a portion 10 of the frame of a motor vehicle, this frame having mounted thereon a motor 11, crank case 12, clutch casing or housing 13, transmission shaft 14, including universal joints 15, casing 16 for the main change speed mechanism and a transmission shaft 17 extending rearwardly to the rear axle 18.

The main change speed mechanism housed in the casing 16 is of the usual construction and is operated by means of a change speed lever 19 mounted on the clutch casing 13 and connected to the change speed mechanism by means of links 20.

As stated in the objects of the invention, it is desirable to drive pneumatic tired trucks at a higher rate of speed than the usual solid tired trucks and in order to adapt the standard models of trucks for such a higher rate of speed without changing the entire design of the change speed mechanism, I have provided an auxiliary change speed unit which in this instance is interposed between the clutch casing 13 and the transmission shaft 14.

This auxiliary change speed unit comprises a casing 21 secured to the clutch casing 13 by means of suitable bolts 22 and extending outwardly therefrom, this casing housing the change speed mechanism and portions of the driving and driven shafts. The drive shaft 23 is connected through any suitable clutch mechanism to the crank shaft of the motor and this shaft extends through one end of the casing 13 into the casing 21, thrust bearings 24 and ball journal bearings 25 being provided in the casing 13 for the shaft. A spider 26 is keyed as shown at 27 to the shaft 23, the spider being retained on the shaft by nut 28 and having mounted adjacent its outer periphery stub shafts 29 on which are secured planet gears 30.

A control pinion 31 is slidably mounted on the shaft 23 and has teeth 32 meshing with the teeth of the planet gears 30. The spider 26 has formed thereon inwardly extending teeth 33 forming clutch members which are adapted to mesh with the teeth 32 of the pinion 31 in one position of adjustment of the pinion.

A fixed gear or brake member 34 having inwardly extending teeth 35 is secured by bolts 36 to a flanged member 37 and to the clutch casing 13 and this member has a laterally extending flange 38 which retains the ball bearings 25 in place. The member 34 also houses a packing member 40, retaining this member in position to prevent the escape of lubricant from the ball bearings 25 along the shaft 23. The teeth 32 of the pinion 31 are adapted to mesh in one position of adjustment of the pinion with the teeth 35 of the member 34.

In order to shift the pinion 31 along the shaft 23 there is secured to this pinion a channeled member 41 which is engaged by a yoke 42 carried by a spindle 43, the spindle being actuated by a lever 44 to shift the pinion 31 to the desired position of adjustment.

Figure 2:
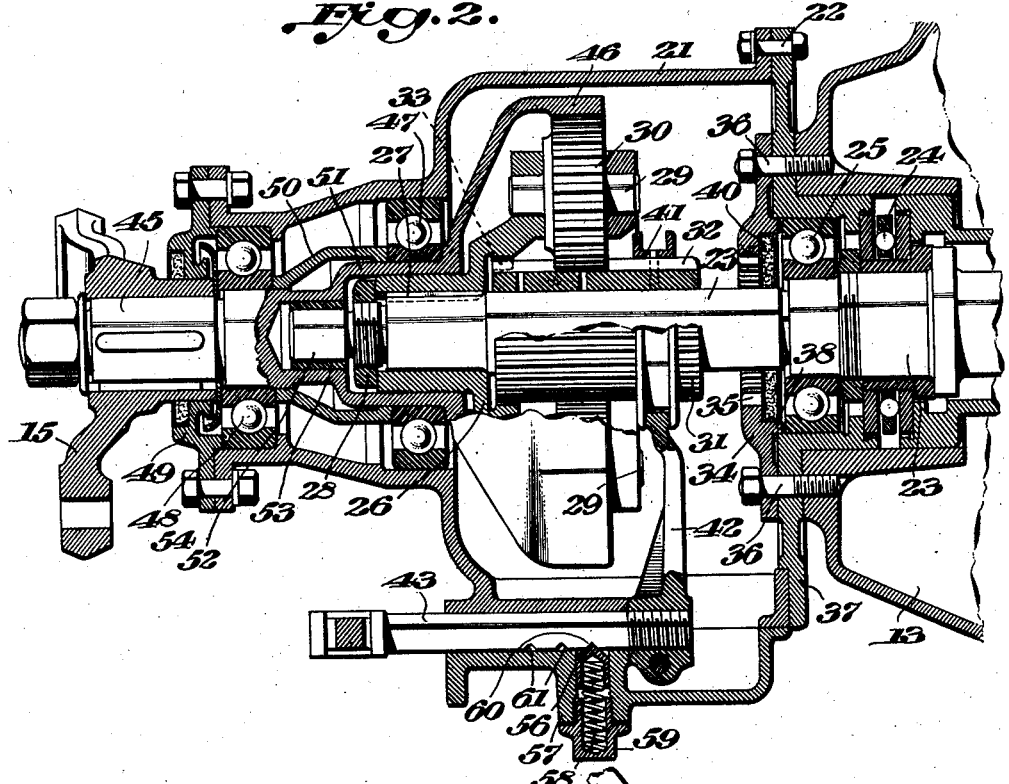
Figure 2 is a longitudinal sectional view, on an enlarged scale, illustrating the change speed unit.
Figure 3:
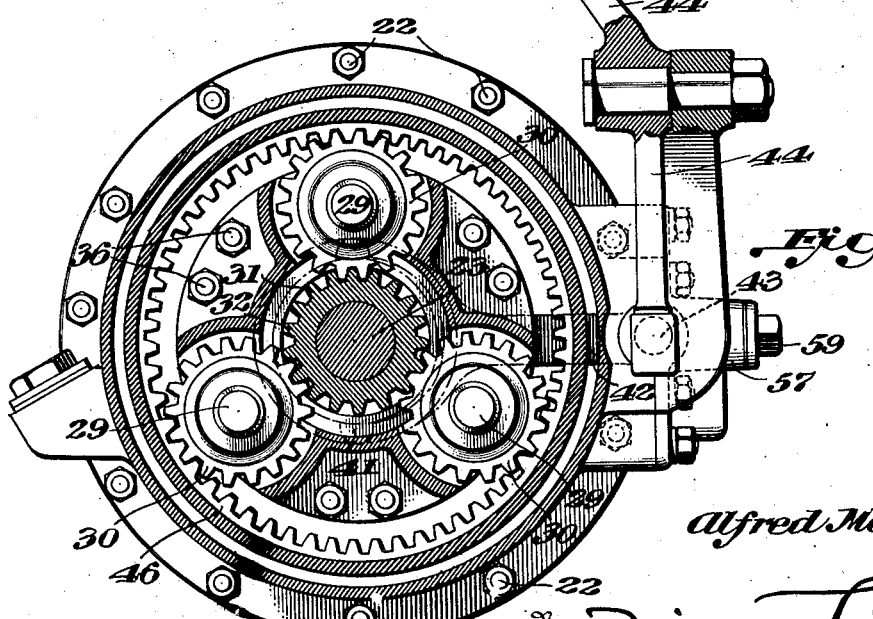
Figure 3 is a sectional view taken substantially on line 3—3 of Fig. 2, this view being taken at right angles to Fig. 2.

The means for transmitting the drive from the planet gears 30 to the driven shaft 45 comprises a ring gear 46 which surrounds the free end of the shaft 23 and is journaled in ball bearings 47 carried by the casing 21. The ring gear, as illustrated in Fig. 2, is in this instance formed integral with the driven shaft 45 and the shaft is mounted in ball bearings 48 carried by the end of the casing 21 and secured in place by a cap 49. A spacing member 50 is mounted on the shaft 45 and on the sleeve 51 which integrally connects the shaft to the ring gear and this spacing member maintains the bearings 47 and 48 in position. As shown at 52 the free end of the shaft 23 is mounted in a bushing 53 carried by the hollow end portion 54 of the shaft 45. The shaft 45 is connected at its free end to one of the universal joints 15 through which this shaft is connected to the transmission shaft 14.

In order to retain the yoke 42 and spindle 43 in adjusted position, a plunger 56 is reciprocably mounted in an outwardly extending boss 57 formed on the casing 21, this plunger being actuated by means of a spring 58 interposed between the plunger and a cap 59 secured to the boss 57. The inner end of the plunger is pointed, as shown at 60 and is adapted to engage any one series of notches 61 formed in the spindle 43, thereby retaining the yoke and spindle in adjusted position.

The auxiliary change speed unit above described operates in the following manner:

In the position of adjustment of the control pinion 31 illustrated in Fig. 2, the drive shaft 23 is directly connected to the driven shaft 45, since the pinion is locked against rotation with respect to the spider 26 by means of the engagement of the teeth 33 formed on the spider with the teeth 32 of the pinion. The spider 26 is keyed to the shaft 23 and therefore rotates therewith and inasmuch as the pinion 32 can not rotate with respect to the spider, the planet gears 30 are also locked and the ring gear 46 is locked because of its engagement with the planet gears. Therefore, the shaft 23, spider 26, control gear 31, planet gears 30, ring gear 46 and driven shaft 45 all rotate together as a unit and there is no change in speed between the shaft 23 and the shaft 45.

When the operator desires to effect an increase in speed between the shafts 23 and 45, the control gear 31 is shifted along the shaft 23 toward the right (looking at Fig. 2) into engagement with the brake member 34. Because of this engagement the pinion 31 is locked against rotation and inasmuch as the spider 26 and planet gears 30 are rotated with the shaft 23 these members will rotate about the pinion 31 and will in turn cause the rotation of the ring gear 46 at a higher rate of speed, thereby effecting an increase of speed between the shafts 23 and 45.

When the control gear 31 is adjusted to a position intermediate the member 34 and the teeth 33 on the spider 26, the transmission mechanism is "in neutral" and no motion is transmitted from the shaft 23 to the shaft 45.

From the above description it will be seen that I have provided a very simple and compact change speed unit which may be readily attached to and detached from the standard driving connections of motor vehicles.

While I have illustrated and described one specific embodiment of the invention it will be evident that the invention is capable of modification and that changes in the construction and in the arrangement of the various cooperating parts may be made without departing from the spirit or scope of the invention as expressed in the following claims.

Having described my invention what I claim and desire to secure by Letters Patent is:

1. In a motor vehicle, in combination, a casing having bearings at both ends, a drive shaft extending into the casing and mounted in the bearing at one end thereof, a driven shaft mounted in the bearing at the other end of said casing, a spider secured to the drive shaft and journaled within the driven shaft, a planetary pinion mounted on said spider, a ring gear mounted on said driven shaft and in mesh with said pinion, a sliding gear mounted on said drive shaft also in mesh with said pinion, and means to lock said sliding gear against rotation.

2. In a motor vehicle, in combination, a casing having a drive shaft and a driven shaft mounted in alignment therein, a spider secured to said drive shaft and having a pinion, a gear on the driven shaft in mesh with said pinion, an elongated pinion slidable and rotatably mounted on said drive shaft, means for locking said elongated pinion against rotation, and means, operable only when the elongated pinion is unlocked, for locking said elongated pinion to said spider.

3. In combination a casing, a drive shaft mounted therein, a driven shaft journaled in said casing, a brake member secured to said casing, a spider secured to said drive shaft and having planet gears mounted thereon, clutch members formed on said spider, a pinion slidably mounted on said drive shaft, meshing with said planet gears and adapted in different positions of adjustment to engage the brake member on the casing or the clutch member on said spider and means for operatively connecting said planet gears to said driven shaft.

4. In combination, a drive shaft, a driven shaft, a spider secured to said drive shaft, planet gears carried by said spider, a ring gear secured to said driven shaft, a pinion slidably mounted on said drive shaft, means for locking said pinion against rotation and means for locking said pinion in engagement with said spider for rotation therewith, only one of said last two means being operable at one time.

5. In combination, a drive shaft, a driven shaft, planetary gearing interposed between said shafts having a controlling pinion slidably mounted on one of said shafts and means for adjusting said pinion including a flanged collar surrounding and secured to said pinion between the ends thereof.

6. In a motor vehicle, in combination, a casing, a driving shaft journaled therein, a spider secured to said shaft and having a planetary pinion, an elongated pinion slidable and rotatably mounted on said drive shaft between the journal of said shaft and said spider, members having internal teeth arranged on said casing and on said spider respectively, of substantially the same diameter as said elongated pinion, and adapted to be engaged by the respective ends of said elongated pinion at different times, and a driven gear meshing with the planetary pinion.

In testimony whereof I affix my signature.

ALFRED MOORHOUSE.